United States Patent
Senesac et al.

(10) Patent No.: US 10,831,948 B2
(45) Date of Patent: Nov. 10, 2020

(54) MODEL BASED SPATIAL INTEGRATION (MBSI) FOR 3D PRODUCTION ILLUSTRATION (PI)

(71) Applicant: The Boeing Company, Chicago, IL (US)

(72) Inventors: Christopher J. Senesac, Daniel Island, SC (US); Andrew A. Austill, Renton, WA (US); Jarom C. Schertz, Summerville, SC (US)

(73) Assignee: The Boeing Company, Chicago, IL (US)

( * ) Notice: Subject to any disclaimer, the term of this patent is extended or adjusted under 35 U.S.C. 154(b) by 415 days.

(21) Appl. No.: 15/703,339

(22) Filed: Sep. 13, 2017

(65) Prior Publication Data

US 2019/0080041 A1    Mar. 14, 2019

(51) Int. Cl.
*G06G 7/48* (2006.01)
*G06F 30/15* (2020.01)
*G06F 113/16* (2020.01)

(52) U.S. Cl.
CPC .......... *G06F 30/15* (2020.01); *G06F 2113/16* (2020.01)

(58) Field of Classification Search
CPC .............................. G06F 17/50; G06F 17/5095
USPC ........................................................... 703/8
See application file for complete search history.

(56) References Cited

U.S. PATENT DOCUMENTS

| 2014/0288614 A1* | 9/2014 | Hagedorn | A61B 5/0482 607/45 |
| 2017/0032057 A1* | 2/2017 | Garimella | G06F 17/5004 |

OTHER PUBLICATIONS

Zhu et al. (A methodology to enable automatic 3D routing of aircraft Electrical Wiring Interconnection System, (16 pages)). (Year: 2017).*
3D PDF viewer for iOS and Android, ProtoTech Solutions, published prior to Sep. 13, 2017, pp. 1-5, http://prototechsolutions.com/product/3d-pdf-viewer-ios-android/.
Solidworks Electrical 3D & Schematics, GoEngineer, published prior to Sep. 13, 2017, goengineer.com/wp-content/uploads/2016/08/Electrical-2D-3D.pdf.
Lockheed Martin Selects Anark Core for 3D PDF, TenLinks, published prior to Sep. 13, 2017, pp. 1-6, http://www.tenlinks.com/news/lockheed-martin-selects-anark-core-for-3d-pdf/.

* cited by examiner

*Primary Examiner* — Andre Pierre Louis
(74) *Attorney, Agent, or Firm* — Miller, Matthias & Hull LLP

(57) ABSTRACT

Systems and methods for displaying a wiring diagram entail reading a computer aided design (CAD) file representing the wiring diagram. Structures surrounding a wiring bundle represented in the wiring diagram are determined and multiple views are generated showing the structures and the wiring bundle. Descriptive labels are automatically associated with the wiring bundle and the multiple views are saved to a production illustration (PI) file.

20 Claims, 6 Drawing Sheets

MODEL BASED SPATIAL INTEGRATION (MBSI) FOR 3D PRODUCTION ILLUSTRATION (PI)

TECHNICAL FIELD

The present disclosure relates generally to manufacturing and more particularly, to systems and methods for providing wire installation illustrations, which may be applicable to, for example, the manufacturing of aircraft, heavy machinery, automotive, locomotives, etc.

BACKGROUND

In the aircraft construction industry, floor workers generally use engineering drawings to facilitate the running and bundling of wiring. Traditionally, drawings were created by artists who would physically board an aircraft and draw a rendering of the wire installation. This process was time consuming and labor intensive, and in the 1980s gave way to the use of Computer Aided Design (CAD) tools to assist in the generation of 2D prints of wire installations. However, such systems are somewhat inflexible in their rendering of additional views in real-time, and the presentation can be difficult for those with less experience to understand.

Before proceeding, it should be appreciated that the present disclosure is directed to a system that may address some of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to accurately catalog or comprehensively summarize any prior art reference or practice. As such, the inventors expressly disclaim this section as admitted or assumed prior art.

SUMMARY

In accordance with one aspect of the present disclosure, a computer-implemented method of displaying a wiring diagram is provided. In an embodiment of the disclosed principles, the method is executed by a processor based on computer-executable instructions read from a non-transitory computer-readable medium and includes reading a computer aided design (CAD) file representing the wiring diagram (displaying the routing of multiple wire bundles) and determining structures surrounding a wiring bundle represented in the wiring diagram. A plurality of views are generated showing the structures and the wiring bundle and descriptive labels are associated with the wiring bundles. As will be noted below, a view is a 2D representation of a 3D structure from a particular point of view. Thus, a single 3D structure supports an infinite number of possible views. The plurality of views are saved to a production illustration (PI) file. Thus, an end user, e.g., a manufacturing floor worker responsible for wiring, may observe one or more specific views to understand the routing and placement of a specific wire bundle.

In accordance with another aspect of the present disclosure, a system is provided for displaying a wiring diagram. The system includes a CAD file source and a CAD file destination device. The CAD file destination device includes a processor configured via computer executable instructions stored on a non-transitory computer-readable medium to read a CAD file from the CAD file source, wherein the CAD file comprises the wiring diagram including a wiring bundle, and to determine one or more structures surrounding the wiring bundle. The processor generates a plurality of views showing the structures and the wiring bundle and associates descriptive labels with the wiring bundles. The plurality of views is saved to a PI file.

In accordance with yet another aspect of the present disclosure, a method provides instructions on the installation of a wiring bundle in an aircraft. The method entails reading a wiring diagram file to determine structures associated with the wiring bundle represented in the wiring diagram, generating a plurality of views showing the structures and the wiring bundle and saving the plurality of views to a PI file.

The features, functions and advantages that have been discussed can be achieved independently in various embodiments or may be combined in yet other embodiments, further details of which can be seen with reference to the following description and drawings.

DETAILED DESCRIPTION

Figure 1:
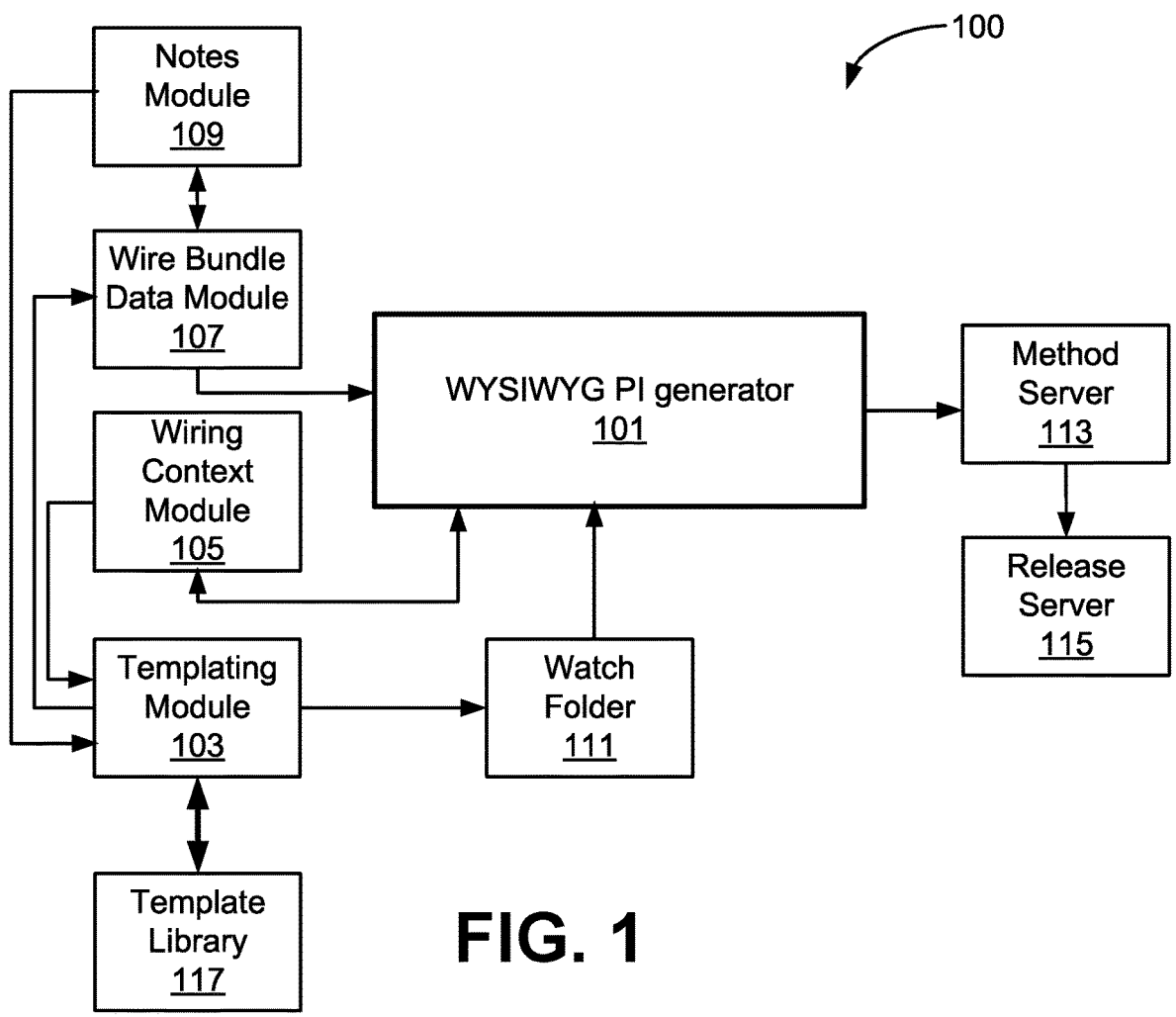
FIG. 1 is a modular view of a 3D PI (production illustration) generator in accordance with an embodiment of the disclosed principles.

Although the following sets forth a detailed description of numerous different embodiments, it should be understood that the legal scope of protection is defined by the words of the claims set forth at the end of this patent. The detailed description is to be construed as example only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent other than the language of the claims. To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Before moving to a detailed discussion, a brief overview is provided to aid the reader's later understanding. As may be apparent from the inventors' background observations above, the use of CAD tools to assist in the generation of 2D prints of wire installations, while common, entails numerous disadvantages in practical usage.

In various embodiments of the principles disclosed herein, a 3D (three-dimensional) production illustration ("PI" or PI file") may be provided by a "What You See Is What You Get" (WYSIWYG) engineering workstation. Each PI includes a plurality of views such that an end user, e.g., a manufacturing floor worker responsible for wiring, may observe in the PI one or more specific views in order to understand the routing and placement of a specific wire bundle.

The disclosed Model Based Spatial Integration Production Illustrator (MBSI PI) is a software tool, process and method for creating a 3D model of a wiring installation that can be delivered in 3D to the shop floor on a tablet using a 3D ISO (International Standards Organization) standard product representation compact (PRC) file format viewed with a standard reader such as the ADOBE READER available from Adobe Systems of San Jose, Calif. The PRC file format is designed for 3D visualization using PDF and other similar document formats. However, in other embodiments other tools and formats are possible.

The disclosed production illustrator facilitates visualization of wire bundles in 3D, in context with structure, and provides the ability to trace a bundle, isolate a bundle, and interrogate a bundle or wire. This solution increases production speed and accuracy during aircraft manufacture, and will ultimately lower labor costs associated both with the manufacturing personal and the PI generation personnel. The ability to interrogate the design on the shop floor was not possible with 2D prints, and as such, 3D PI provides increased overall quality and first time quality with respect to installation of the wire harness.

In operation, the disclosed MBSI PI automatically generates views for a 3D PDF showing wiring bundles. In an embodiment, the camera frustum is automatically positioned based on the view, and wiring elements within the frustum are automatically shown or hidden as needed.

With this overview in mind, and turning now to FIG. 1, this figure shows a modular view of a 3D PI generator in accordance with an embodiment of the disclosed principles. The illustrated 3D PI 100 includes a number of modules that will be summarized here and then addressed in greater detail as the description of processes proceeds. It will be appreciated that modules and computer-implemented steps are executed via a processor reading and executing computer-executable instructions from a computer-readable non-transitory memory as described later in conjunction with FIG. 6.

The core of the 3D MBSI PI 100 is the WYSIWYG PI generator 101. Other modules in the 3D MBSI PI 100 that provide an input directly or indirectly to the WYSIWYG PI generator 101 include a templating module 103, a wiring context module 105, a wire bundle data module 107, a notes module 109, and a watch folder 111. The templating module 103 stores and provides templates of predefined views to be extracted from a given 3D structure represented in a 3D file, as well as the format of related fields. In a simplified example, a template may specify that the views include front, back, top and right side views, and that the front and top views include component labels.

The wiring context module 105 stores and provides information regarding structures that surround or interact with a wire bundle. For example, a wiring bundle may pass through a two-inch hole in a former with at least a half-inch clearance on all sides. Alternatively, the bundle may pass through the hole but be retained to a side of the hole via a cable retainer. These types of context information that may be stored and provided by the wiring context module 105.

Similarly, the wire bundle data module 107 stores and provides structural information regarding one or more wire bundles in conjunction with one or more structures of the aircraft or other structure being built. For example, a certain wire bundle (a group of wires in close proximity) may run along a certain stringer and through holes in certain formers; this structural information regarding the bundle would be provided by the wire bundle data module 107. The notes module 109 provides non-visible data usable in labels, e.g., wire gauge and wire type (e.g., stranded, solid, shielding type, etc.). The watch folder 111 comprises a folder stored on a memory medium, such a server memory, that contains a most recent 3D representation, e.g., CAD representation, of a wiring system of an aircraft or other structure of interest.

On the output side of the WYSIWYG PI generator 101, the 3D MBSI PI 100 also includes a method server 113 and a release server 115. The templating module 103 may work in conjunction with a template source such as template library 117 to store, retrieve and update templates.

Figure 2:
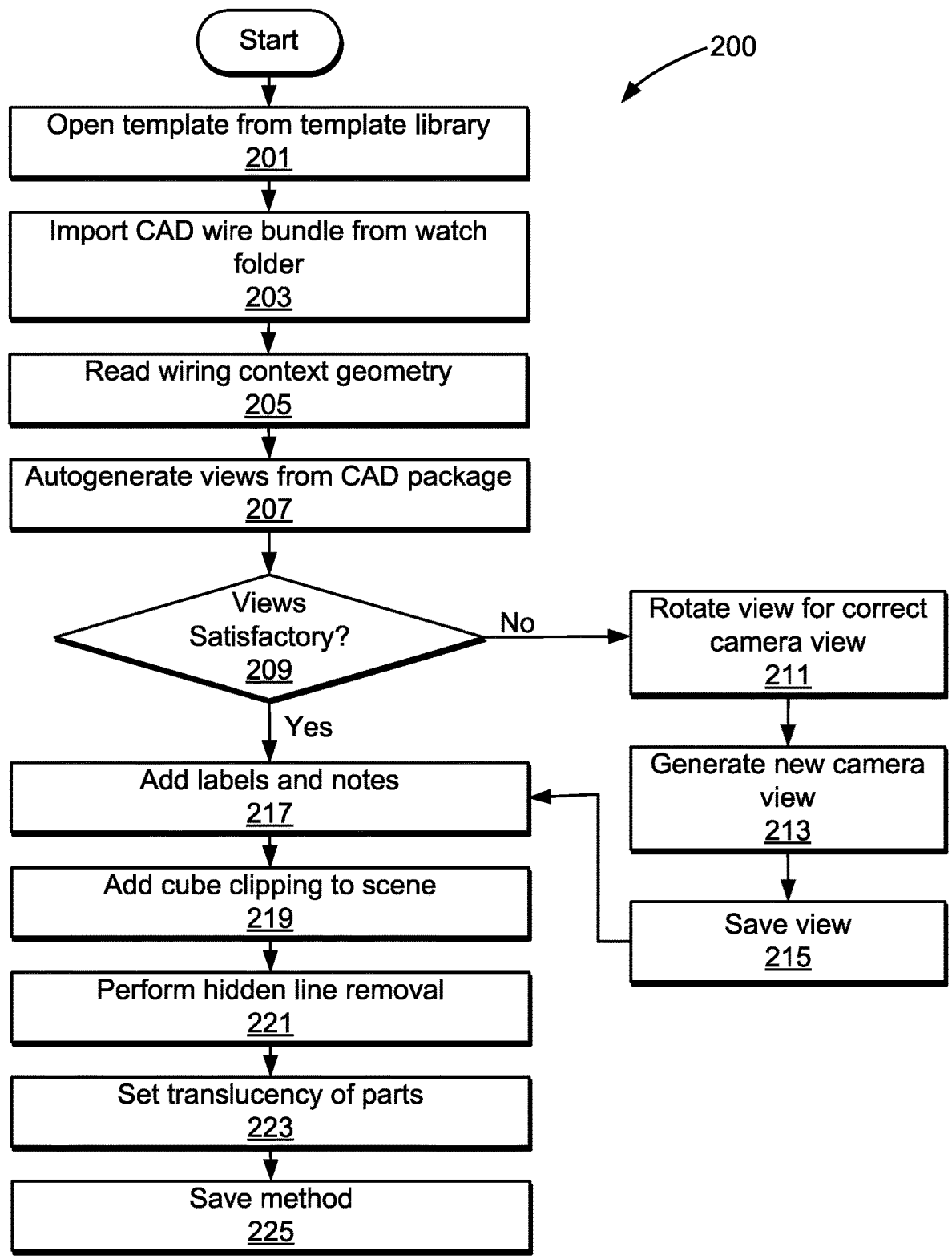
FIG. 2 is a flow chart illustrating a process of 3D PI generation in accordance with an embodiment of the disclosed principles.

In accordance with an embodiment of the disclosed principles, a PI generation process is illustrated in the flow chart of FIG. 2. In the illustrated process 200, a user first opens a template, e.g., from the template library 117, at; stage 201. In keeping with the opened template, the templating module 103 imports a CAD wire diagram comprising the routing of numerous wiring bundles at stage 203, e.g., from the wire bundle data module 107. The wire diagram includes data to visually reproduce the appearance of the wiring including all wire bundles and the structure of the craft that would appear adjacent any wire bundle. The wire diagram may also be referred to as a "wiring diagram" or a "CAD wire diagram." The wire diagram may be stored as a CAD file, e.g., a file stored in memory that is formatted as computer aided design file. Each wire bundle includes a group of one or more electrical or optical conductors, with the wiring diagram typically showing multiple distinct wire bundles. Although the CAD wire diagram includes data regarding all wiring in the craft being built, certain views into that data may be created, as described elsewhere herein. For example, the wiring leading into the cockpit may not be shown in a view that focused on a wire bundle associated with restroom light wiring.

The templating module 103 also reads in any structure surrounding e.g., behind or in front of, the wire bundle from the wiring context module 105 at stage 205 in order to model the wire bundle in context with the surrounding aircraft structure. The templating module 103 generates a CAD package including a CAD file and associated resource files at stage 207.

Figure 4:
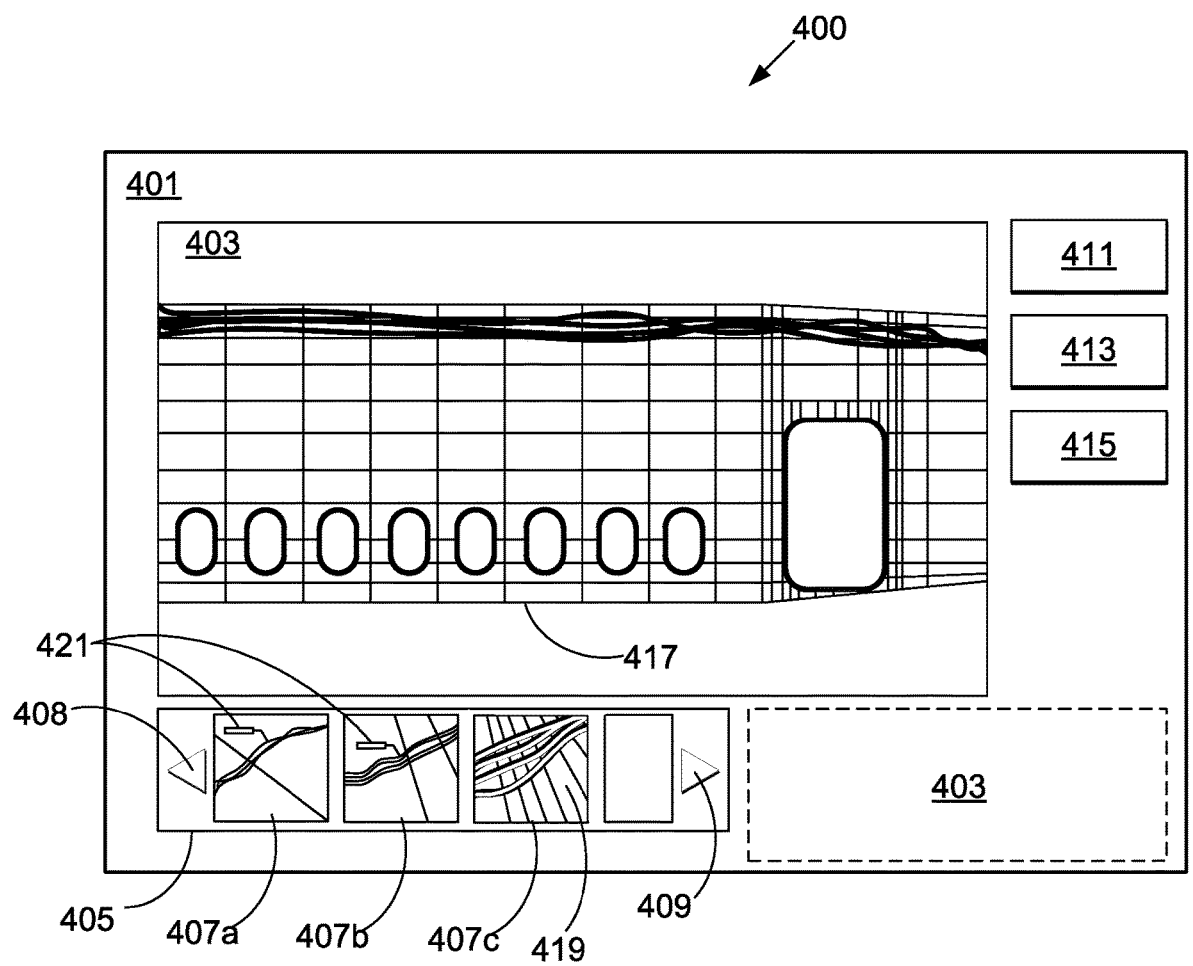
FIG. 4 is a simplified screen view of an application for accessing a 3D PI by an end user in accordance with an embodiment of the disclosed principles.
Figure 5:
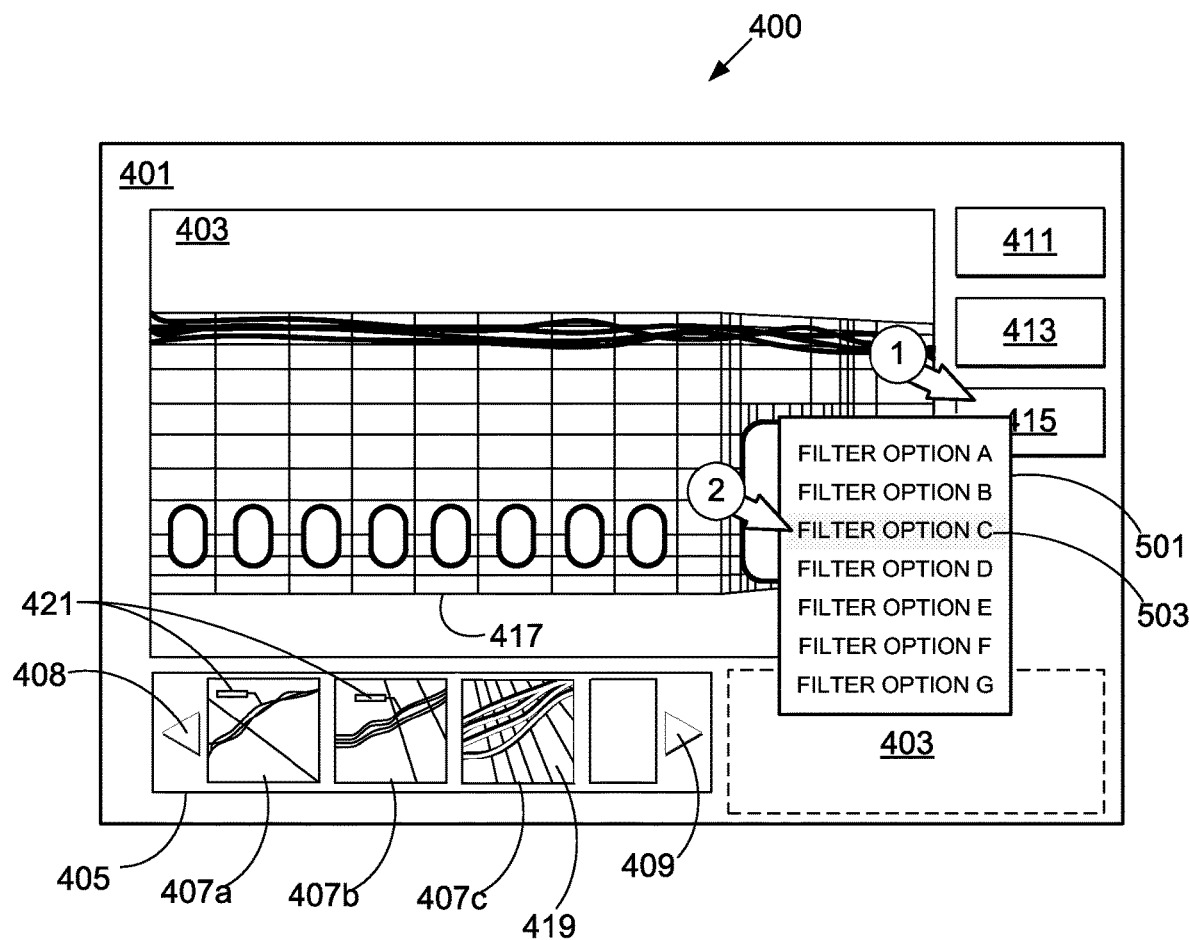
FIG. 5 is a further simplified screen view based on the view of FIG. 4 in accordance with an embodiment of the disclosed principles.

Views are auto generated at stage 207 based on views established in the CAD package. Various views are shown in FIGS. 4 and 5 and will be discussed in greater detail in conjunction with those figures, but it will be appreciated that a view is a 2D representation of a 3D structure from a particular point of view. Thus, a single 3D structure supports an infinite number of possible views. The autogeneration of views generates views based on the points of view represented in the CAD package (CAD file and associated meta data and resources). Thus, for example, if the CAD package includes a view of an aircraft interior wiring bundle taken from 10 degrees above horizontal at two meters' distance, the autogenerated views will include this view. A first view of a structure (e.g., aircraft frame and wiring) is different from a second view of the same structure when the views differ in distance or point of view.

The autogenerated views are then displayed to the user for approval at stage 209, and if the views are satisfactory to the user, the process 200 skips to stage 217, wherein the WYSIWYG PI generator 101 adds labels and notes from the wire bundle data module 107 and notes module 109 respectively. The wire bundle data module 107 stores and provides structural information regarding one or more wire bundles in conjunction with one or more structures of the aircraft or other structure being built. For example, a certain wire bundle (a group of wires in close proximity) may run along a certain structure, such as, for example, a stringer, and through holes in certain formers; this structural information regarding the bundle would be provided by the wire bundle data module 107. The notes module 109 provides non-visible data usable in labels, e.g., wire gauge and wire type (e.g., stranded, solid, shielding type, etc.).

If an illustrated view is not satisfactory to the user at stage 209, then at stage 211, the WYSIWYG PI generator 101 rotates the view to a different camera angle, optionally selected by the user, and at stage 213, the new camera view is generated. The WYSIWYG PI generator 101 saves the view at stage 215, and moves on to stage 217, wherein the WYSIWYG PI generator 101 adds labels and notes from the wire bundle data module 107 and notes module 109 respectively.

At stage 219, any desired cube clipping is added to the scene, that is, to show only structure lying inside a designated cube and clipping the structure outside the cube. Cube clipping or cropping is not a default behavior, but rather follows a user's optional selection, via cursor movement, of an area of interest in a view. The selection may be a 2D selection that is extrapolated in the third dimension to form the bounds of the cube. Dynamic automatic hidden line removal is also performed on the scene at stage 221, wherein hidden lines are lines that would be obscured in a physical view of a subject (e.g., they lie behind a foreground object), and translucency of parts is set where needed at stage 223. Translucency of a part is appropriate where a background structure is of interest but a foreground structure provides a context such as location, e.g., where a wire bundle passes through a hole behind a structural member. Once all the view scenes are processed, a method is saved at stage 225, e.g., to the method server 113, containing all scenes, states, clipping, and labels.

Figure 3:
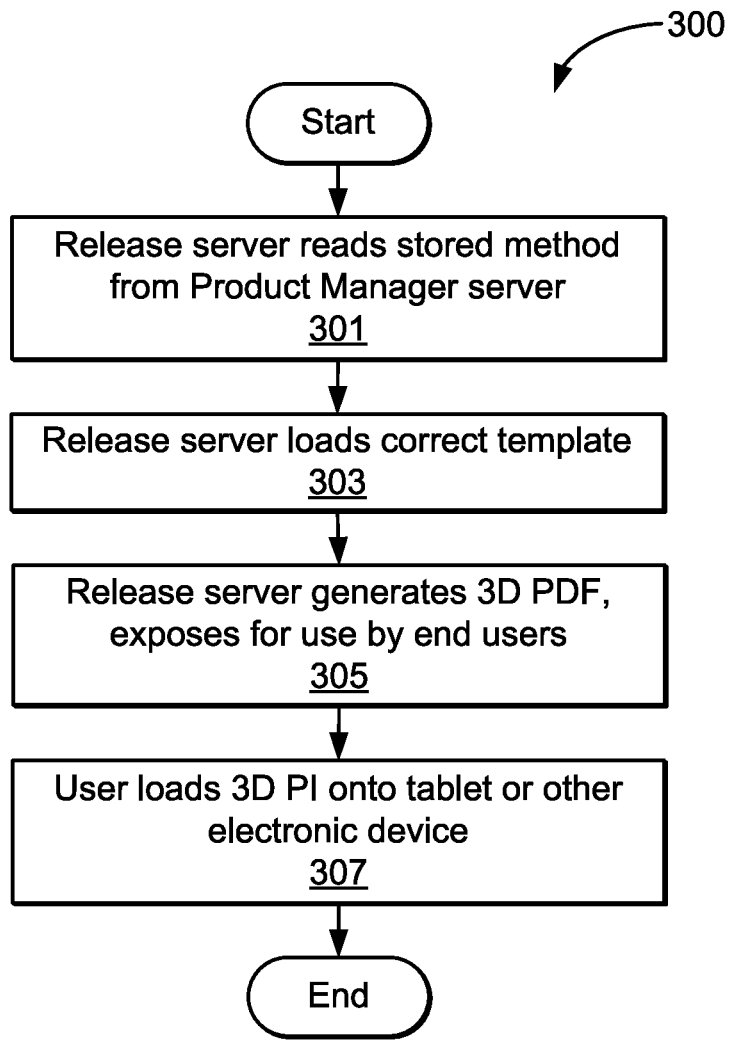
FIG. 3 is a flow chart illustrating a process of 3D PI usage in accordance with an embodiment of the disclosed principles.

As noted above, the method can later be retrieved by workers on the floor in order to facilitate actual construction of the wiring configuration of interest. An example process of such retrieval and use is shown as process 300 in FIG. 3. The process 300 takes place after a wire harness method has been released and is available for use. At stage 301 of the process 300, a server, e.g., release server 115 reads the stored method, e.g., from the method server 113. The release server 115 then loads the correct template at stage 303, and uses the method to provide all needed data to create scenes, clipping and labeling.

The release server 115 creates a 3D PDF file (e.g., a 3D ISO PRC file as discussed above, or other 3D formatted file) and exposes it for use by floor workers (wiring construction workers) at stage 305. At stage 307 of the process 300, a user loads the MBSI 3D PI onto their tablet or other electronic device and uses it to instruct them how to install the wire harness.

There are numerous ways in which a floor worker or other end user may interact with a 3D PI produced as described above, and it is not practicable to describe all such ways. However, an example of one such technique is shown in the simplified screen view of FIG. 4. The illustrated screen 400, generated by a viewer application accessing a 3D PDF as described above, may be displayed on a cellphone, laptop computer, tablet, desk top computer and so on, includes a primary area 401 populated by various windows and icons for viewing and manipulating wiring scenes.

More particularly, in the example of FIG. 4, a wiring bundle view area 403 is used to display a current scene of interest, e.g., the location and configuration of the wiring in a portion of interest of the bundle in an aircraft 417 under construction, as derived from the 3D PDF. In an embodiment, the view may be manipulated by direct use of a finger, stylus, cursor or other interaction element.

Moreover, the primary area 401 may include a scene selection area 405, from which a user may select an alternative view (e.g., an enlarged view) from an array of views 407a, 407b, 407c. The views 407a, 407b, 407c available for selection may by scrolled, in the illustrated embodiment, via one or more scroll icons 408, 409. Selection of a view of interest may be made from the array of view 407a, 407b, 407c via a suitable interaction modality such as a finger, stylus, cursor or other interaction element. As can be seen, certain views such as 407c more clearly show aircraft structures 419 behind a wiring bundle. Such structures may be any aircraft structure, e.g., beams, stringers, ducts, skin, door frames, aircraft frame members and so on.

The wiring bundle view area 403 may also include icons 421 that provide a description of a wire or wiring bundle. The icons 421 may be associated with wiring bundle such that the icon 421 is linked to the wiring bundle (e.g., points to the wiring bundle via, for example, a line, a callout box, etc.). As another option, icons 421 may also be shown in the views 407.

Additional icons in the illustrated embodiment include various function icons 411, 413, 415. An investigation icon 411, when selected, allows the user to further investigate the wiring bundle of interest. The icon 411 may be used by selecting an area of interest in the current scene via lasso, boxing, or other user interface technique, and then selecting the investigation icon 411. The investigative icon 411 will assist the user in centering and focusing the scene detail for use with 1 or 2-finger screen touch user interface with the 3D model.

Another action icon shown in the illustrated embodiment is a "trace bundle" icon 413. Selection of the trace bundle icon 413 will cause the application to highlight a user-selected bundle in the current view. The highlighted view may omit, make transparent or otherwise deemphasize non-selected bundles and any otherwise blocking structural components.

Finally, a filters icon 415 may be selected by the user to hide or filter out certain structures and components. For example, the user may wish to see connectors but not structure. Once the filter function is selected via the appropriate icon 415, the filter function can be configured in a number of ways. One exemplary mechanism for configuring the filter function is shown in FIG. 5.

In the illustrated mechanism, selection of the filter icon 415 by the user results in the display of a drop-down list 501. The drop-down list 501 includes multiple filer options for user selection. Although listed generically in the figure for ease of understanding, such options may include "wire only," "selected bundle only," "no structure," and so on. For clarity, the figure shows user selection of an option 503 from the drop-down menu 501.

The modules described herein are software modules which operate via the computer-execution of computer-executable instructions (or code) read from a non-transitory computer-readable medium. Similarly, the method steps entail, in an embodiment, the computer execution of computer-executable instructions (or code) read from a non-transitory computer-readable medium.

Figure 6:
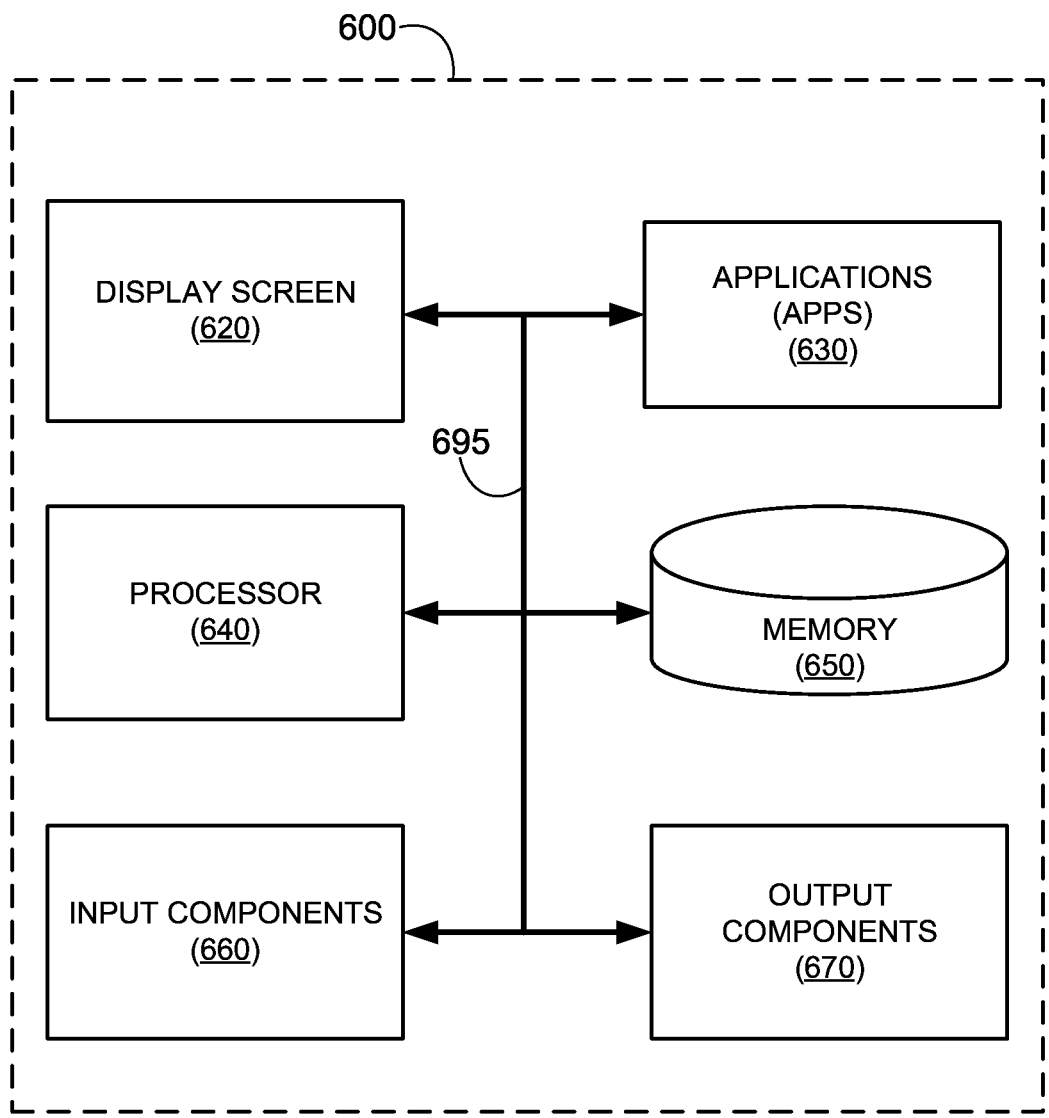
FIG. 6 shows an example processor-based computing device within which various embodiments of the disclosed principles may be implemented.

In this connection, FIG. 6 shows an example processor-based computing device 600 within which embodiments of the disclosed principles may be implemented. The illustrated example includes several exemplary components. It will be appreciated, however, that additional or alternative components may be used in a given implementation depending upon user preference, component availability, price point and other considerations. Moreover, the device 600 may be a desktop computer, work station, laptop computer, handheld computing device, server or other computing device. It will be appreciated that some architectures will lack some features, e.g., a server lacking a display, and other architectures may include additional features, e.g., a laptop computer having built-in audio facilities.

In the illustrated embodiment, the components of the user device 600 include a display screen 620, applications (e.g., programs) 630, a processor 640, a memory 650, one or more input components 660 such as speech or text input facilities, and one or more output components 670 such as software and hardware networking components to allow communications to and from the device 600. Such networking components provide wireless networking functionality, although wired networking may additionally or alternatively be supported.

The processor 640 can be any of a microprocessor, microcomputer, application-specific integrated circuit, or the like. For example, the processor 640 can be implemented by one or more microprocessors or controllers from any desired family or manufacturer. Similarly, the memory 650 may reside on the same integrated circuit as the processor 640. Additionally or alternatively, the memory 650 may be accessed via a network, e.g., via cloud-based storage. The memory 650 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 650 may include a read only memory (i.e., a hard drive, flash memory or any other desired type of memory device).

The information that is stored in the memory 650 can include program code associated with one or more operating systems or applications as well as informational data, e.g., program parameters, process data, etc. The operating system and applications are typically implemented via executable instructions stored in a non-transitory computer readable medium (e.g., memory 650) to control basic functions of the electronic device 600. Such functions may include, for example, interaction among various internal components and storage and retrieval of applications and data to and from the memory 650.

Further with respect to applications 630, these typically utilize the operating system to provide more specific functionality, such as file system service and handling of protected and unprotected data stored in the memory 650. Although many applications may provide standard or required functionality of the device 600, in other cases applications provide optional or specialized functionality, and may be supplied by third party vendors or the device manufacturer.

With respect to informational data, e.g., program parameters and process data, this non-executable information can be referenced, manipulated, or written by the operating system or an application. Such informational data can include, for example, data that are preprogrammed into the device during manufacture, data that are created by the device or added by a user, or any of a variety of types of information that are uploaded to, downloaded from, or otherwise accessed at servers or other devices with which the device is in communication during its ongoing operation.

In an embodiment, the device 600 is programmed such that the processor 640 and memory 650 interact with the other components of the device 600 to perform a variety of functions. The processor 640 may include or implement various modules and execute programs for initiating different activities such as launching an application, transferring data and toggling through various graphical user interface objects (e.g., toggling through various display icons that are linked to executable applications). Thus, for example, computing modules described herein such as the WYSIWYG PI generator 101, templating module 103, wiring context module 105, wire bundle data module 107, and notes module 109 may be implemented as software modules on one or more computing devices similar to the illustrated device 600. The in-memory or running program code and data associated with any such modules is, in an embodiment, non-transitory information stored on a non-transitory memory medium, such as a RAM, ROM or other media mentioned above.

It will be appreciated that the foregoing description provides examples of the disclosed apparatus, systems and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

What is claimed is:

1. A computer-implemented method of displaying a wiring diagram, the method being executed by a processor based on computer-executable instructions read from a non-transitory computer-readable medium and comprising the steps of:
   reading a computer aided design (CAD) file, wherein the CAD file comprises the wiring diagram, the wiring diagram including a routing of a wiring bundle;
   determining a structure surrounding the wiring bundle represented in the wiring diagram;
   generating a plurality of views showing the structures and the wiring bundle;
   associating descriptive labels with the wiring bundle;
   saving the plurality of views and descriptive labels as a method;
   reading the saved method;
   loading a template associated with the saved method;
   applying the saved method to a template to create a production illustration (PI) file;
   storing the PI file; and
   displaying the PI file on a display of the user.

2. The computer-implemented method in accordance with claim 1, wherein the PI file comprises a 3D pdf file.

3. The computer-implemented method in accordance with claim 1, wherein the wiring bundle is a wiring bundle within an aircraft and wherein the structure includes one or more structures of the aircraft.

4. The computer-implemented method in accordance with claim 1, further comprising providing the saved method for access by a user.

5. The computer-implemented method in accordance with claim 4, wherein providing the saved method for access by the user comprises providing the saved method to a release server.

6. The computer-implemented method in accordance with claim 1, further comprising accessing a template of views.

7. The computer-implemented method in accordance with claim 6, wherein generating a plurality of views showing the structures and the wiring bundle comprises accessing the CAD file in accordance with the template.

8. The computer-implemented method in accordance with claim 1, wherein reading the CAD file comprises downloading the CAD file from a watch folder.

9. A system for displaying a wiring diagram comprising:
a computer aided design (CAD) file source; and
a CAD file destination device comprising a processor;
the processor being configured via computer executable instructions stored on a non-transitory computer-readable medium to:
read a CAD file from the CAD file source, wherein the CAD file comprises the wiring diagram including a routing of a wiring bundle, determine a structure surrounding the wiring bundle, generate a plurality of views showing the structure and the wiring bundle, automatically associate descriptive labels with the wiring bundle save the plurality of views and the descriptive labels as a method, read the saved method, load a template associated with the saved method, apply the saved method to the template to create a production illustration (PI) file, store the PI file, and display the PI file on a display of the user.

10. The system in accordance with claim 9, wherein the PI file is a 3D pdf file.

11. The system in accordance with claim 9, wherein the wiring bundle is a wiring bundle within an aircraft and wherein the structure includes one or more structures of the aircraft.

12. The system in accordance with claim 9, wherein the processor is further configured to provide the saved method for access by a user.

13. The system in accordance with claim 12, wherein the processor is further configured to provide the saved method for access by the user by providing the saved method to a release server.

14. The system in accordance with claim 9, wherein the template includes one or more predefined views.

15. The system in accordance with claim 14, wherein the processor is further configured to generate the plurality of views showing the structure and the wiring bundle by accessing the CAD file in accordance with the template.

16. The system in accordance with claim 9, wherein the processor is further configured to read the CAD file by downloading the CAD file from a watch folder.

17. A method of providing instructions on the installation of a wiring bundle in an aircraft, the method comprising:
reading a wiring diagram file to determine structures associated with the wiring bundle represented in the wiring diagram, the wiring diagram including a routing of the wiring bundle;
generating a plurality of views showing the structures and the wiring bundle;
dynamically setting a translucency of a portion of each of the plurality of views;
saving the plurality of views and translucency settings as a method;
applying the saved method to a template to create a production illustration (PI) file; and
displaying the PI file on a display of a user.

18. The method of providing instructions in accordance with claim 17, further comprising associating descriptive labels with the wiring bundles prior to saving the plurality of views.

19. The method of providing instructions in accordance with claim 17, wherein the PI is a 3D pdf file.

20. The method of providing instructions in accordance with claim 17, wherein the structures includes one or more structures of the aircraft.

* * * * *